Patented June 29, 1954

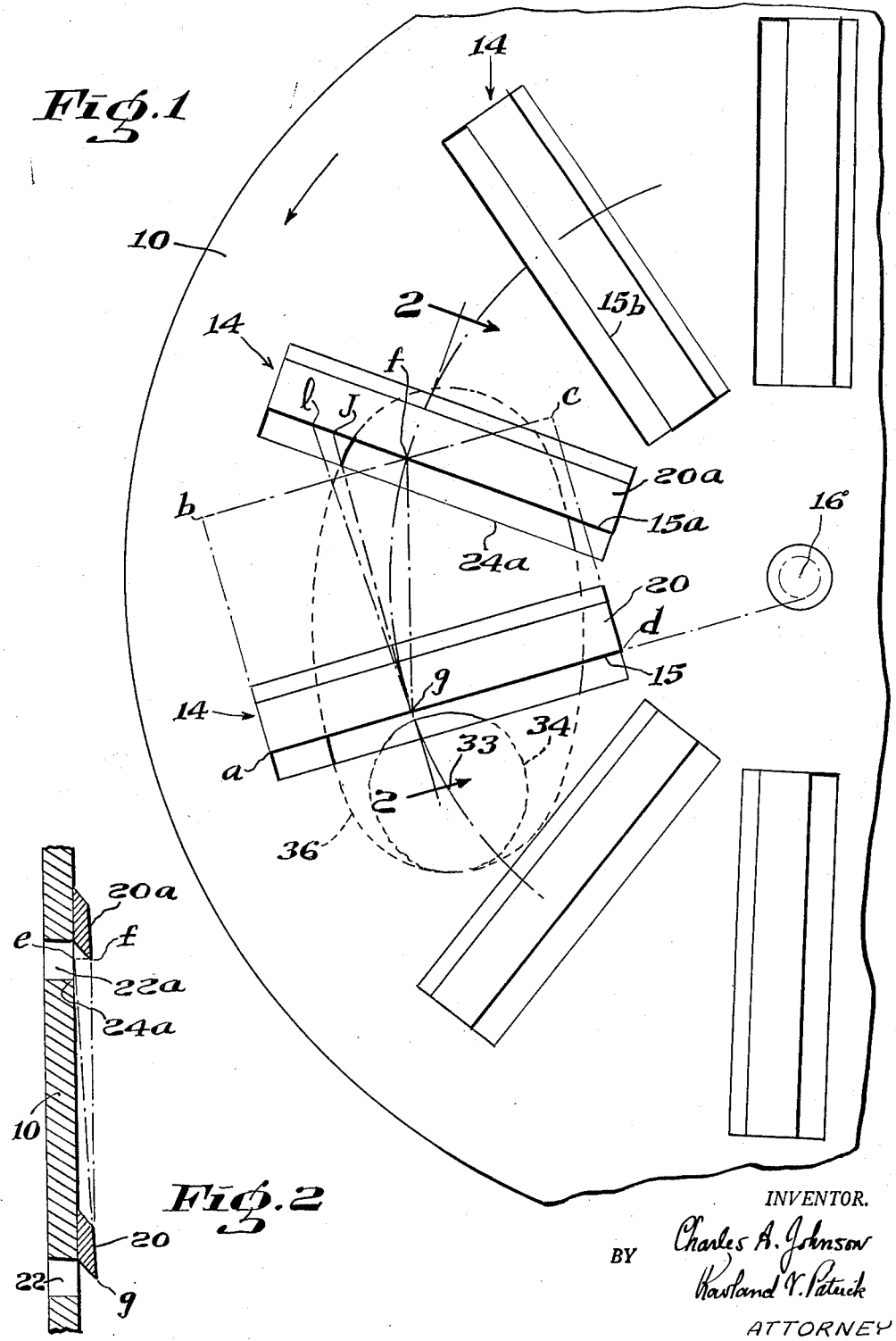

2,682,375

UNITED STATES PATENT OFFICE 2,682,375

ROTARY CHIPPER KNIFE BLADE MOUNTING

Charles A. Johnson, Berlin, N. H.

Application March 5, 1952, Serial No. 274,928

1 Claim. (Cl. 241—92)

This invention relates to rotatable discs of the type used in the pulp industry as log chippers.

Such chippers are described in the September 1948 issue of the "Paper Industry and Paper World," page 883. As there described, a typical chipper is formed of a heavy steel disc having knives disposed about the face of the disc and extending generally radially outwardly of the disc.

In my previously filed application Serial No. 117,676, filed September 24, 1949, now Patent 2,655,319, issued October 13, 1953, I have described a chipper, the knife blade of which has a particular and novel geometry obtaining an entirely new principle of log chipping operation.

As therein explained, it had been usual to mount the knife blades on the disc in such manner that they project from the face of the disc with plane leading surfaces and with their cutting edges diverging outwardly from the disc center but revolving in a common plane. The outer surfaces of the blades were bevelled backwardly to form an angle of draw with the plane of revolution of the cutting edges. This angle was never, however, considered to have any special significance, and was chosen solely to insure a sharp cutting edge, the plane leading surface of the blade conventionally being set at an angle of 45° to the plane of revolution of the disc. The result was, as explained in my earlier application, that a log fed to the disc would contact the face of the disc between the cutting edges and, for this purpose, the disc was provided at these contact points with hard wear plates to take the thrust of the log.

One purpose of the invention disclosed in my previous application was to prevent the log from coming into contact with any plane wear surface on the disc and, to that end, in one form of my invention, claimed in said application, a blade is provided which has a back surface so formed as to provide a progressively decreasing angle of draw outwardly of the blade.

In view of the mechanical difficulties of making and maintaining such a blade, my prior co-pending application disclosed, as a modified form of device, composite knives, each made up of two or more blades set end to end with their straight cutting edges aligned but the angle of draw of an inner blade, while uniform throughout, was greater than the angle of draw of the aligned cutting edge of an adjacent outer blade. In this case, the geometry could be such that the log would contact a much smaller area on the face of the disc between the blades than in the case of a single blade of the same length having a uniform bevel throughout its length equal to the bevel at its inner end.

I have found that under certain circumstances, the advantages inherent in my aforesaid inventions can be obtained to a certain degree by utilizing a blade whose backwardly extending surface has a uniform angle of inclination from the plane of revolution of the cutting edge throughout the length of the blade provided that that inclination is properly chosen, as hereinafter described, with relation to the remainder of the geometry of the chipper disc and feed spout therefor.

As known, the disc is provided with a series of slots, one adjacent each cutting edge for receiving and disposing of the cut chips. Such slots are generally parallel to the cutting edge with which the slot is associated.

According to the present invention, the inclination of the plane surface constituting the backwardly extending bevelled edge of a knife blade is such that it lies in a plane which intersects the plane of revolution of the leading edge of the following slot along a line, parallel to the leading knife edge, which line passes through a point perpendicularly beneath a point on the following knife edge at a radius corresponding to the disc radius at which the center of the advancing end of an average diameter log is fed to the disc.

These principles will be more clearly understood by reference to the accompanying drawings, wherein:

Fig. 1 is a fragmentary plan view of six knives of a ten-knife disc;

Fig. 2 is a cross-sectional view taken along the broken line 2—2 of Fig. 1 with projection and construction lines added in dot-and-dash form.

Figure 3:
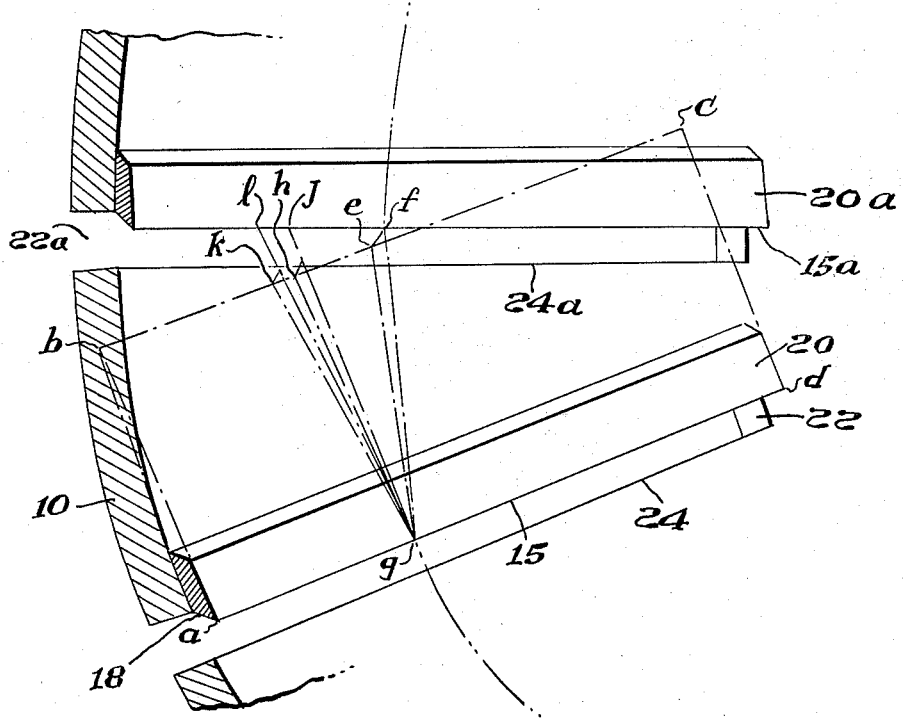
Fig. 3 is a fragmentary perspective view looking inwardly of the disc of Fig. 1.

It matters not whether the cutting edges are mounted exactly on radii of the disc or whether, as in the preferred case and as shown in the drawings, they extend along lines tangent to a circle concentric with the axis of the disc. The latter form is preferred because it aids in securing a slicing action of the cutting edges through the log.

Because it was conventional to set the leading plane surface of the knife at an angle of about 45° to the plane of revolution to the cutting edge, the bevel was carried back quite sharply in order to avoid a blunt edge, with the result that the plane of the surface of the backwardly extending knife intersected the plane of revolution of the leading edge of the following slot along a line ahead of the edge of that slot. Since, in accordance with my construction, the inclination of the outer surface of the blade is such that the plane in which it lies extends backwardly much farther, I also encountered bluntness. However, I avoid bluntness by first fixing the angle of inclination of the outer surface of the blade for the purposes of this invention and then I change the angle of inclination of the leading plane surface of the blade to make a sharp cutting edge. Hence, my leading surface, instead of having the traditional 45° inclination to the plane of disc revolution, has a lesser angle, usually about 40-42°, thus maintaining a cutting edge angle of about 36-38°, which is not too blunt, and thus leaving an angle of draw of from 2-4°.

As shown in the drawings, the disc 10 has mounted thereon a series of symmetrically spaced knife blades 14 having straight cutting edges 15, 15a, 15b, etc., the cutting edges diverging outwardly of the disc and lying along straight lines which are tangent to a circle concentric with the axis 16 of the disc. The edges 15, 15a lie in a common plane of revolution. Each of the blades 14 is set in the disc by conventional means (not shown) so that the blade projects from the face of the disc with a plane leading surface 18 (Fig. 3). The outer surface of the blade 20 is bevelled backwardly from the cutting edge 15 towards the face of the disc.

Adjacent each blade and lying beneath the cutting edge 15 thereof is a disc slot 22 having a leading edge 24, whereby the chips may pass through the disc as they are cut.

Since all the blades are identical, only one will be described, it being understood that the description is applicable to each of the blades.

As shown particularly in Fig. 3, the angle of inclination of the surface 20 is such that the plane a, b, c, d in which the surface 20 lies intersects the plane of revolution of the leading edge 24a of the following slot along the line b, c. Line b, c is parallel to the cutting edge 15 due to the uniformity of the angle of bevel of surface 20 throughout the length of the cutting edge 15.

It should be noted that the line b, c crosses the trace of the following cutting edge 15a at a point which corresponds to the point e in Fig. 2, that is, a point perpendicularly discwards of a point f along the cutting edge 15a, line e, f (Fig. 3) being perpendicular to the plane of revolution of cutting edges 15 and 15a; and this point f is selected as that point along the cutting edge 15a which will pass through the center 33 of the advancing end of a log 34, which has an average diameter of a run of logs to be fed to the cutter. Phrased differently, the point f will be at the same radius with respect to disc axis 16 as the center of the end of a log of average diameter positioned in the feed spout 36 against the cutting edges. It will be noted that the oval opening 26 of the feed spout for the log will accommodate logs smaller and larger than log 34 and, hence, the point f may vary somewhat along the cutting edge 15a, depending upon the average diameter log in a particular overall operation and the particular position and shape of the feed spout 36.

A point along the cutting edge 15 at equal radius with point f is point g.

Assuming log 34 is fed along its axis, the points g and f will, therefore, successively pass through the center 33 of the log as the disc rotates.

The angle of inclination between the outer bevelled surface 20 of the blade from the plane of revolution of cutting edge 15 is, therefore, dictated by the particular loci of the points f and g as determined by the average diameter of log and the position of the spout relative to axis 16.

Picturing the cutting blades as constituting these single points g and f only, the angle of draw at point g, is such that the log will be fed discwards an amount corresponding to the length of the line e, f while the point f passes through an arc of revolution corresponding to the circumferential distance on that arc of revolution between the points g and f. Theoretical perfect cutting action with uniform constant log advance will then take place at the radius of these cutting points g and f. Inwardly along the cutting edges from these points f and g and outwardly thereof, there is a compromise action tolerated solely in the interest of enabling one to use a knife blade having a plane outer surface as distinguished from an outer surface, the angle of inclination of which towards the disc varies along the cutting edge, e. g. of the type shown and described in my aforesaid prior application.

In preparing the knives for mounting, it is most practical to grind the bevel perpendicular to the cutting edge 15. In such case, the bevel of surface 20, therefore, at the cutting edge 15 will be at an angle, taken in a plane perpendicular to the cutting edge 15, to the plane of revolution of the cutting edge which corresponds to the angle h, g, j (Fig. 3), the line g, j lying in the plane of revolution of the cutting edges and the line g, h lying in the plane in which the surface 20 lies, and both lines g, j and g, h being perpendicular to the cutting edge 15.

The only portion of the outer surface of the blade 20 which will brush by a given point in the log 34 through which the point g has just passed will be that part of the outer surface 20 which lies along the arc of revolution (Fig. 1) of the points g and f. A very minute part of this arc will lie radially outwardly of the line g, h but none of it will lie outwardly of the line g, l which represents a tangent to the arc g, f at point g. No portion of the outer surface 20 between the chord of the arc g, f and the arc g, f will brush by that point. Since the difference in angle of inclination of the angle k, g, l shown in Fig. 3 and of the angle h, g, j is minute, the latter serves admirably as determining the angle of inclination of the bevel, provided the line b, c crosses the trace of the blade 15a at the proper place, as shown, namely, at point e lying perpendicularly discwards of the locus of point f, as chosen by the average log size for an expected operation and with due regard to the shape and location of the spout relative to the disc axis 16.

In this manner, greatly improved, although compromised, knife action, is achieved.

Thus, in the present invention, a single blade is utilized having a uniform bevel throughout its length providing an angle of draw at at least one point intermediate its ends and usually substantially centrally thereof, which if taken alone, would attain perfect cutting and uniform log advance.

In one embodiment described in my aforesaid previous application, wherein a composite knife has aligned cutting edges with the sections of the composite knife bevelled to provide different angles of draw, the angle of draw of the inner knife is larger than the angle of draw of the outer knife and, in essence, the larger angle of draw of the inner knife is chosen in accordance with the invention here disclosed, as is the smaller angle of draw of the outer knife. In other words, those two angles were the optimum angles of draw for two widely separated different points along the cutting edge. The preferred form of my invention, as described in the previous application, was, in essence, providing not two perfect points separated along the knife edge, as in the case of the composite knife, nor a single perfect point near the center thereof, as in the case of the embodiment here described, but in providing a perfectly designed point for every point along the cutting edge. Considering the three forms from this standpoint, the embodiment herein described is a single blade knife, having a single bevel, whereas in the earlier application there was described both a sectional blade knife, each section having a different bevel but being of finite length, and a single blade knife which, in effect, had the same geometry as a sectional knife having an infinite number of sections, each with a different bevel.

Having in mind the claims to said other embodiments presented in the aforesaid application, I claim herein:

In a rotatable planar chipper disc having cutting knives symmetrically arranged about the face of the disc and protruding therefrom for providing leading and following straight cutting edges diverging radially outwardly of said disc at an acute angle to one another and lying in a common plane of revolution with a slot through the disc beneath the cutting edge of each knife and wherein each cutting edge lies at the intersection of a plane leading surface of a knife and a plane outer bevelled surface of the knife and wherein said disc is mounted for rotation on a horizontal axis across a feed spout opening guiding logs to said disc end-on at an angle to the plane of revolution of said cutting edges, that improvement which comprises having the outer bevelled surfaces of all the knives lying in planes which intersect the plane of revolution of the leading edge of the slot beneath the following knife edge along lines respectively parallel to the immediately preceding cutting edge and intersecting the leading edge of the slot beneath the following knife at a point intermediate the ends of the cutting edge of said following knife and passing through a point which lies perpendicularly discwards of a point along the cutting edge of the following knife at a disc radius substantially equal to the radial distance, from said horizontal disc axis, of the center of the advancing end of a log of average diameter fed through said spout opening.

References Cited in the file of this patent

UNITED STATES PATENTS

| Number | Name | Date |
|---|---|---|
| 2,388,799 | Payzer et al. | Nov. 13, 1945 |
| 2,570,845 | Ottersland | Oct. 9, 1951 |